United States Patent [19]
Mukumoto

[11] Patent Number: 5,992,301
[45] Date of Patent: Nov. 30, 1999

[54] STEAM COOKING SYSTEM FOR RESTAURANT

[75] Inventor: Atsushi Mukumoto, Osaka, Japan

[73] Assignee: Gourmet Kineya Co., Ltd, Osaka, Japan

[21] Appl. No.: 09/271,995

[22] Filed: Mar. 18, 1999

[30] Foreign Application Priority Data

Mar. 27, 1998 [JP] Japan ................................ 10-082173

[51] Int. Cl.⁶ .............................. A47J 27/00; A47J 27/04; A21B 1/00; A21B 1/08
[52] U.S. Cl. ................................ 99/330; 99/337; 99/341; 99/417; 99/474; 99/483; 99/492; 126/20; 126/369; 219/401
[58] Field of Search .............................. 99/330, 331, 341, 99/337, 338, 410–418, 403, 467–476, 483, 492; 126/20, 20.1, 20.2, 21 A, 369, 377; 219/400, 401; 426/510, 511, 523

[56] References Cited

U.S. PATENT DOCUMENTS

| | | | |
|---|---|---|---|
| 4,011,805 | 3/1977 | Vegh et al. ............................. | 99/474 X |
| 4,274,391 | 6/1981 | Karapetian ........................... | 126/369 X |
| 4,563,364 | 1/1986 | Carmichael et al. .................... | 426/510 |
| 4,582,047 | 4/1986 | Williams ............................... | 126/369 |
| 4,927,060 | 5/1990 | Snowball et al. ........................ | 99/330 |
| 5,381,729 | 1/1995 | Hennessy et al. ....................... | 99/483 |
| 5,398,597 | 3/1995 | Jones et al. ............................. | 99/330 |
| 5,404,808 | 4/1995 | Smith et al. .......................... | 99/467 X |
| 5,515,773 | 5/1996 | Bullard .................................. | 99/330 |
| 5,532,456 | 7/1996 | Smith et al. ........................ | 219/401 X |
| 5,649,476 | 7/1997 | Montagnino et al. .............. | 219/401 X |
| 5,715,360 | 2/1998 | Montagnino ......................... | 99/341 X |
| 5,865,108 | 2/1999 | Montaginino et al. ............... | 99/476 X |

*Primary Examiner*—Timothy F. Simone
*Attorney, Agent, or Firm*—Jiawei Huang; J. C. Patents

[57] ABSTRACT

A steam cooking system for cooking foods such as a light Chinese dish called as dim sum with steam comprises a steam generator disposed outside a guestroom of a restaurant, a cooking chamber formed adjacent to each of tables in the guestroom, and a steam line extending from the steam generator to at least one steam outlet formed in a bottom of the cooking chamber. A valve is provided in the steam line at the vicinity of the steam outlet to be switchable between an open position of supplying steam into the cooking chamber and a close position of stopping the supply of steam. A control unit controls the valve to keep the valve at the open position for a cooking time period determined according to a menu to be cooked with steam. An exhausting unit is formed at a top of the cooking chamber to exhaust used steam from the cooking chamber to the outside of the guestroom. In this system, guests can enjoy the steam cooking operation at the guest's table by themselves and tasting the steam-cooked foods at an optimum tasting temperature.

8 Claims, 7 Drawing Sheets

000
STEAM COOKING SYSTEM FOR RESTAURANT

BACKGROUND OF THE INVENTION

1. Field of the Invention

The present invention relates to a steam cooking system for restaurant, which can be used to cook foods such as a light Chinese dish called as dim sum with steam, and particularly is characterized in that guests can carry out a steam cooking at the guest's table in the restaurant to enjoy the steam cooking by themselves and tasting the steamed foods.

2. Disclosure of the Prior Art

In Chinese restaurants of the past, when guests order a light meal, e.g., dim sum, the dim sum placed in a set of baskets is cooked with steam at a kitchen separated from a guestroom and then waitress or waiter carries the steamed dim sum to the guest's table in the guestroom.

However, when the kitchen is sufficiently spaced from the guest's table, the baskets having the steamed dim sum therein will get cold during a carrying time period of the baskets from the kitchen to the table. For example, the baskets will get cold to such a degree that the waitress can handle the baskets at the table without burn. As a result, the decrease of the basket temperature may bring a deviation from an optimum tasting temperature of the steamed dim sum.

SUMMARY OF THE INVENTION

For solving the above problem, a primary object of the present invention is to provide a steam cooking system, which is characterized in that guests can carry out a steam cooking at the guest's table in the restaurant to enjoy the steam cooking by themselves and tasting the steamed foods. That is, the cooking system comprises a steam generator disposed outside of a guestroom of the restaurant, a cooking chamber formed adjacent to each of tables arranged in the guestroom, and a steam line extending from the steam generator to at least one steam outlet formed in a bottom of the cooking chamber. A first valve is provided in the steam line at the vicinity of the steam outlet to be switchable between an open position of supplying steam into the cooking chamber and a close position of stopping the supply of steam. A control unit controls the first valve to keep the first valve at the open position for a cooking time period determined according to a menu to be cooked with steam. A steam-exhausting unit is formed at a top of the cooking chamber to exhaust used steam from the cooking chamber to the outside of the guestroom. In the present invention, since a steam cooking of foods can be carried out at the cooking chamber formed adjacent to the guest's table, the guests can always enjoy the steam-cooked foods at an optimum tasting temperature. In addition, since used steam is exhausted to the outside of the guestroom by the exhausting unit, it is possible to prevent the occurrence of unpleasant air condition in the guestroom.

It is preferred that the cooking chamber has a window, through which foods to be cooked can be placed into the cooking chamber, and the cooking chamber and the control unit are disposed such that the window and an operation panel of the control unit face a passage extending adjacent to the table. In this case, waitress can readily place the foods in the cooking chamber from the passage side through the window and operate the control unit.

It is also preferred that the cooking chamber has a first window facing a passage extending adjacent to the table and a second window facing guests of the table. In this case, a waitress or waiter can readily place the foods in the cooking chamber from the passage side through the first window. In addition, the guests can safety and readily take out the steam-cooked foods from the cooking chamber to the guest's table through the second window.

By the way, there is a possibility that hot-water drops generated by condensation of steam in the steam line accidentally spout from the steam outlet during the steam cooking operation. To provide a safe cooking operation, it is preferred to provide as a safety means a throttle valve in the steam line to regulate an amount of steam spouted from the steam outlet. Alternatively, it is preferred to use a safety unit comprising a hollow stem connected at a lower end thereof to the steam outlet and a hollow cap connected to an upper end of the hollow stem, which is formed in its bottom with at least one steam hole for changing a spouting direction of the hot-water drops downwardly.

In another preferred embodiment of the present invention, the steam cooking system comprises a drain line branched from a diverging point in the steam line for removing hot-water drops generated by condensation of steam from the steam line. A drain valve for separating the drain line from the steam line is provided in the drain line. The first valve is provided in the steam line at downstream of the diverging point. A second valve is provided in the steam line at upstream of the diverging point. The control unit controls the first valve, second valve, and the drain valve, as described below. That is, the drain valve is opened for a drain operation immediately before the cooking operation, while the second valve being kept at an open position and the first valve being kept at a close position, to thereby feed the hot-water drops from the steam line to the drain line. After the drain operation, the drain valve is closed and the first valve is opened for the cooking operation to supply steam from the steam outlet into the cooking chamber. In this embodiment, the hot-water drops can be removed from the steam line prior to the steam cooking operation. This improves the safety of the steam cooking operation.

These and still other objects and advantages will become apparent from the following detail descriptions of preferred embodiments of the invention when taken in conjunction with the attached drawings.

PREFERRED EMBODIMENT OF THE INVENTION

A steam cooking system of a preferred embodiment of the present invention is explained in details.

Figure 1:
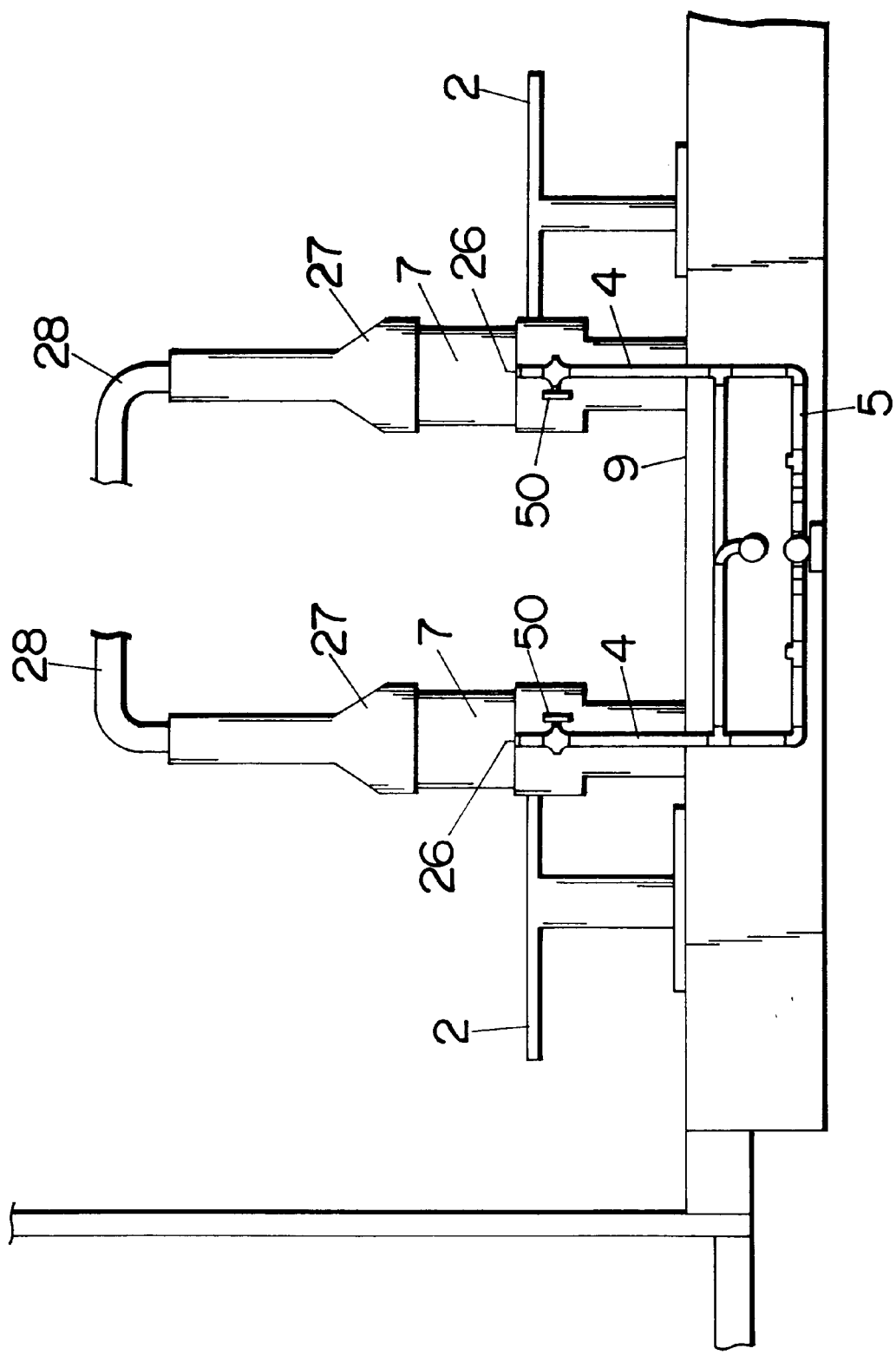
FIG. 1 is a schematic cross-sectional view of a steam cooking system of the present invention.
Figure 2:
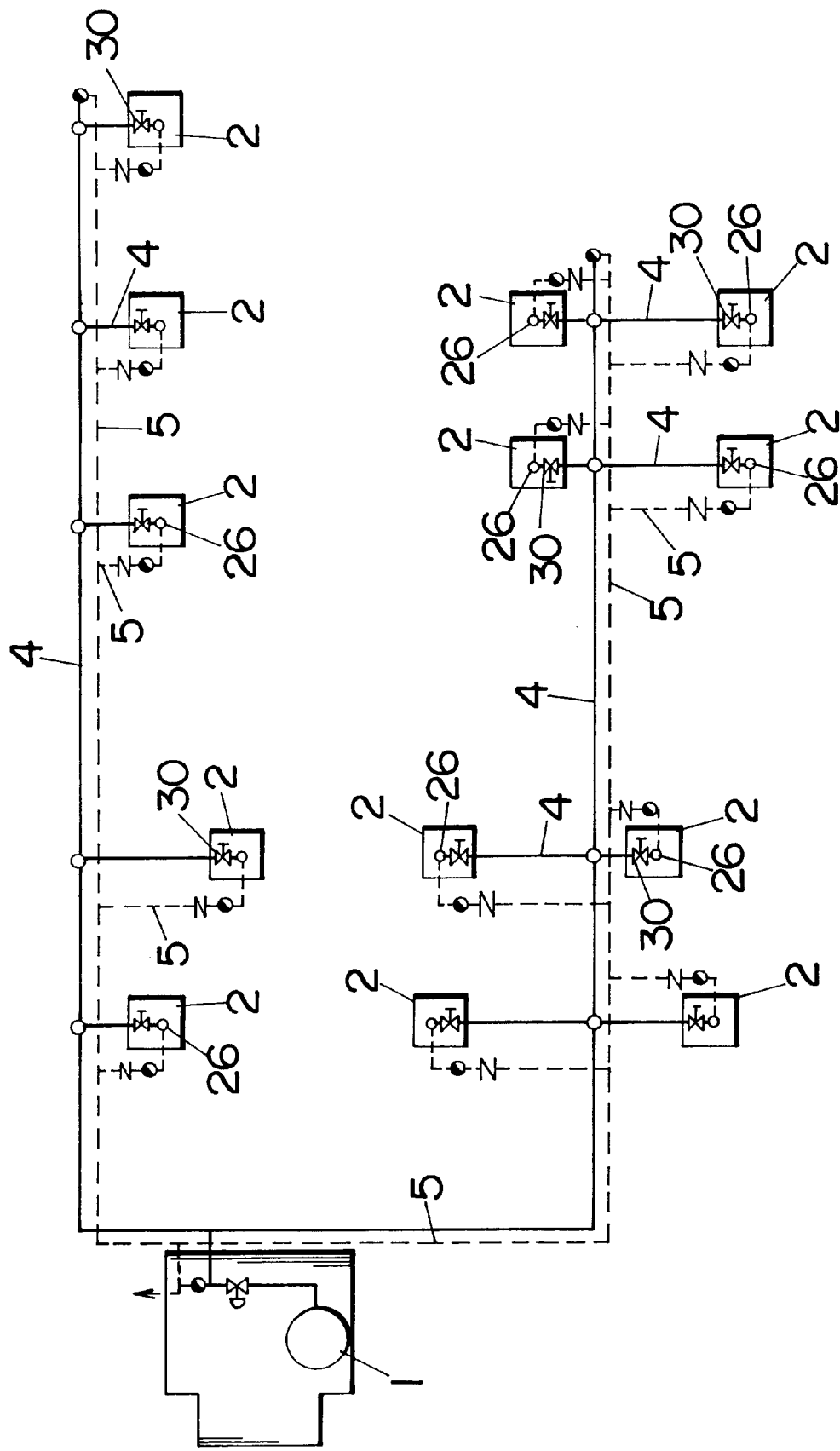
FIG. 2 is a steam-line diagram of the steam cooking system.

In this embodiment, the steam cooking system is used in a Chinese restaurant having a plurality of guest tables 2 in a guestroom. As shown in FIG. 1, each of the tables 2 is spaced from an adjacent table by a passage 9. A cooking chamber 7 used to cook foods such as a light Chinese dish called as dim sum with steam is formed at a passage side of each of the tables 2. As shown in FIG. 2, a steam line 4 extends from a steam generator 1 such as a boiler disposed outside the guestroom to each of the tables 2. The steam line 4 extends under the floor of the guestroom. Numeral 5 designates a drain line for removing hot-water drops generated by condensation of steam in the steam line 4.

Figure 3:
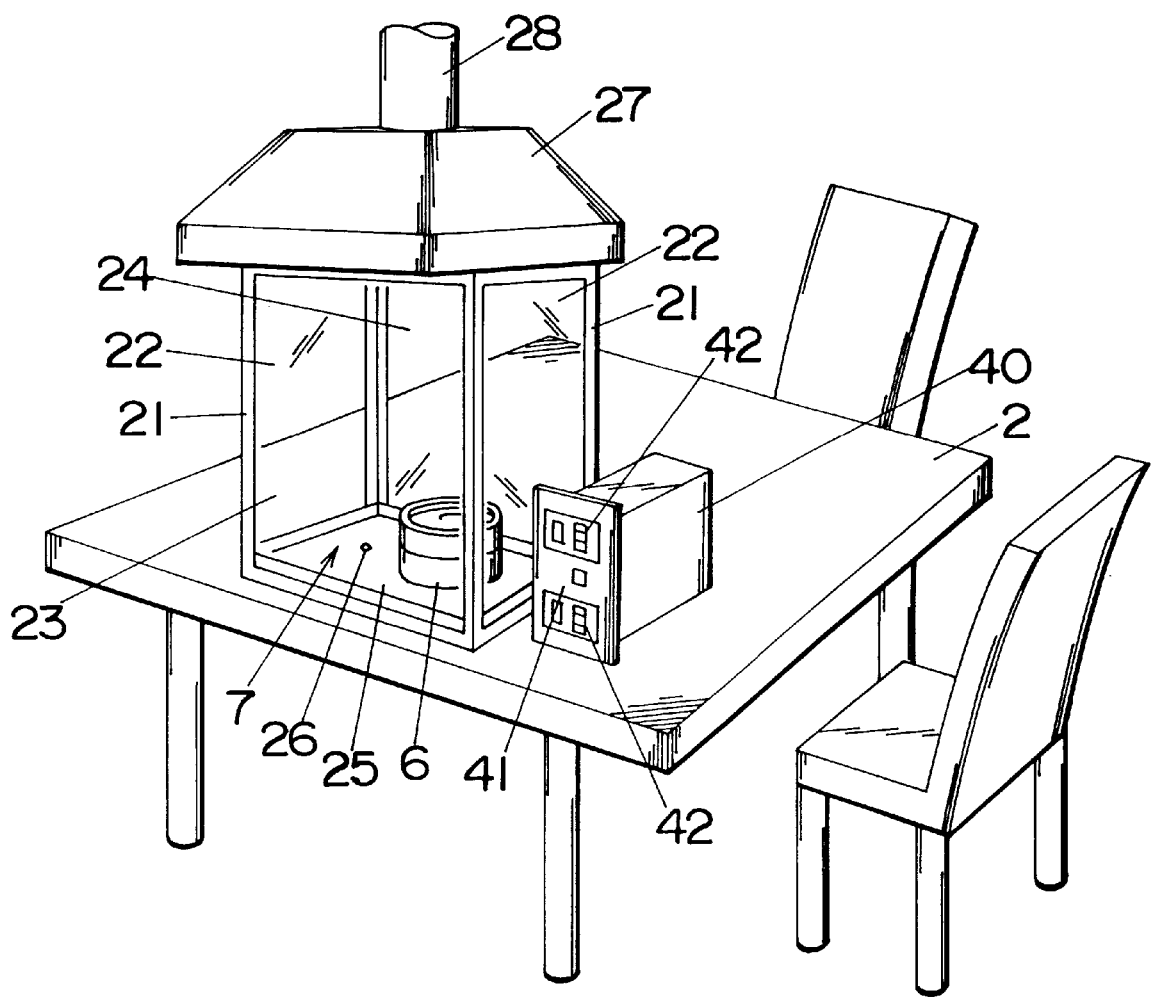
FIG. 3 is a perspective view of a cooking chamber disposed adjacent to a control unit of the steam cooking system.
Figure 4:
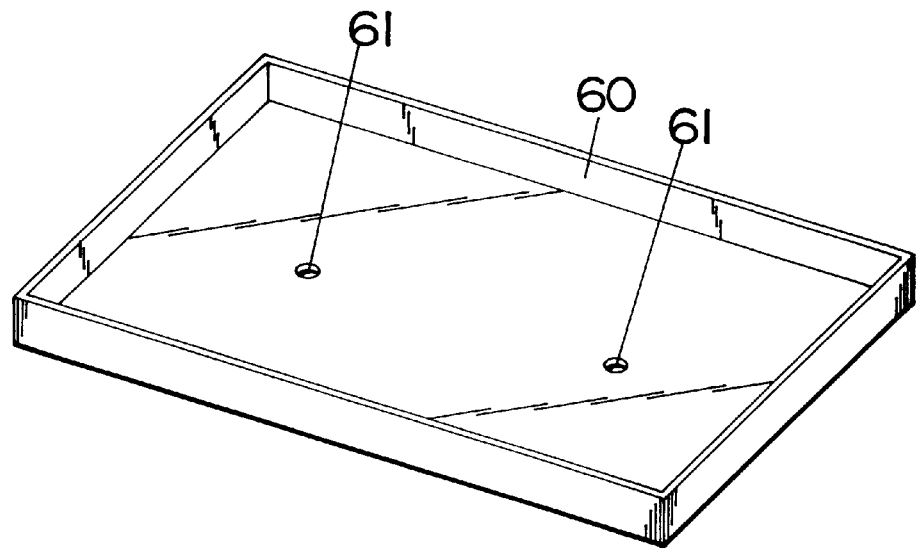
FIG. 4 is a perspective view of a cooking tray.
Figure 5:
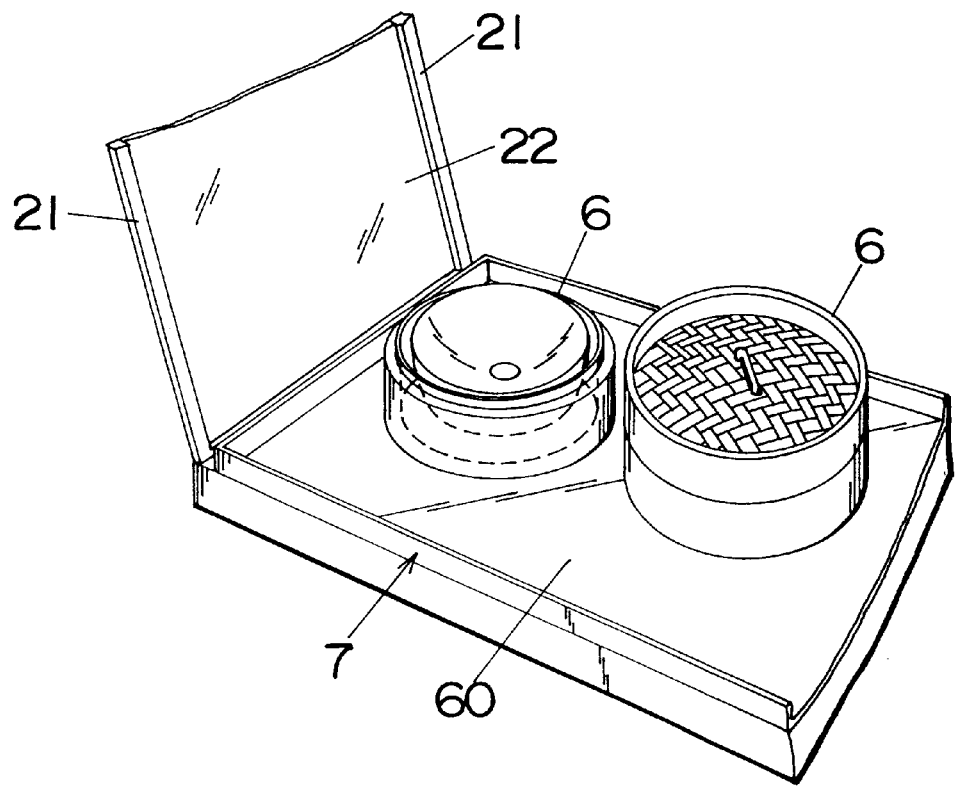
FIG. 5 is a perspective view of a set of baskets placed in the cooking chamber.

As shown in FIG. 3, the cooking chamber 7 is formed with four struts 21, a pair of transparent panels 22, front window 23, rear windows 24, a cooking stage 25 having two steam outlets 26, and a hood 27 with an exhaust duct 28 at its top. The cooking chamber 7 is disposed such that the front window 23 faces to the passage and the rear window 24 faces the guests of the table. As shown in FIG. 4, an exchangeable tray 60 made of a stainless steel is placed on the cooking stage 25 such that two holes 61 formed in the tray are positioned just above the steam outlets 26. This tray 60 may be exchanged for the next guest, if necessary. The steam outlets 26 are connected to the steam line 4 to supply steam into the cooking chamber 7. For example, foods to be cooked are set in a set of baskets 6 as a cooking vessel, and then the baskets are piled up. As shown in FIG. 5, the piled-up baskets 6 are placed on the tray 60 such that a drainboard portion of the bottom basket is substantially positioned above the steam outlet 26.

Steam supplied from the steam outlet 26 penetrates into the piled-up baskets from the drainboard portion. A steam temperature at the vicinity of the steam outlet 26 is about 92° C. However, since an inner pressure of the baskets 6 increases by steam supplied into the baskets, the inner temperature of the baskets becomes higher than the above temperature of steam supplied from the steam outlet 26. For example, the temperature in the baskets 6 may reach about 102° C., which is suitable to cook the foods in the baskets with steam. When the foods in the baskets 6 are cooked with steam supplied from the steam outlet 26, used steam is exhausted to the outside of the guestroom through the exhaust duct 28.

Figure 6:
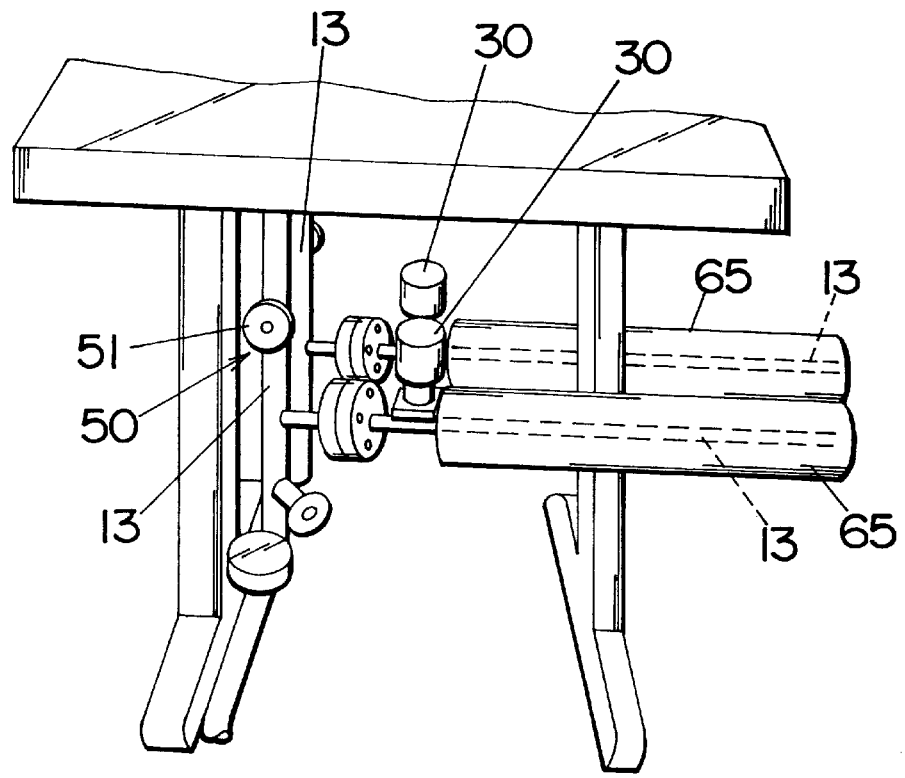
FIG. 6 is a perspective view of first valves provided in the steam line of the steam cooking system.

In the steam cooking system of the present invention, first valves 30 are provided in the steam line 4 to be switchable between an open position of supplying steam into the cooking chamber 7 and a close position of stopping the supply of steam. In this embodiment, an electromagnetic valve is used as the first valve 30. For example, as shown in FIG. 6, the electromagnetic valves 30 are provided in horizontal portions of steam pipes 13 of the steam line 4.

As shown in FIG. 3, a control unit 40 is disposed adjacent to the cooking chamber 7 to control the open and close operations of the electromagnetic valves 30. The control unit 40 can function as a timer for keeping each of the first valves 30 at the open position for a cooking time period determined according to a menu to be cooked with steam. The control unit 40 has a plurality of buttons 42 for various kinds of menus on its operation panel 41. By pushing a button corresponding to a required menu, foods of the menu are cooked with steam for a suitable cooking time period. Since the operation panel 41 of the control unit 40 faces the passage 9, a waitress or waiter can easily push those buttons 42 on the operation panel from the passage side. According to a special menu and an amount of the special menu, it is possible to input a desired cooking time period into the control unit 40.

Typical cooking times required to cook the following Chinese dishes with steam in the cooking chamber 7 are shown below.

| Chinese Dish | Cooking Time Period |
| --- | --- |
| Shumai (Steamed dumpling with the dough gathered at the top) | 5 minutes |
| Shourompou (Small steamed meat pie): | 5 minutes |
| Large steamed meat pie: | 5 minutes |
| Large steamed pork pie: | 5 minutes |
| Steamed bean cured with shrimp: | 5 minutes |
| Steamed dumpling with shrimp: | 5 minutes |
| Bowel powder of lobsters: | 5 minutes |
| Steamed Chinese soymilk skin roll: | 5 minutes |
| Dumpling with shark fin: | 5 minutes |
| Dumpling with spinach: | 5 minutes |
| Spare rib soup with fermented soybean | 10 minutes |
| Rice-dumpling wrapped in bamboo leaves: | 10 minutes |
| Soups: | 3 minutes |

Figure 7:
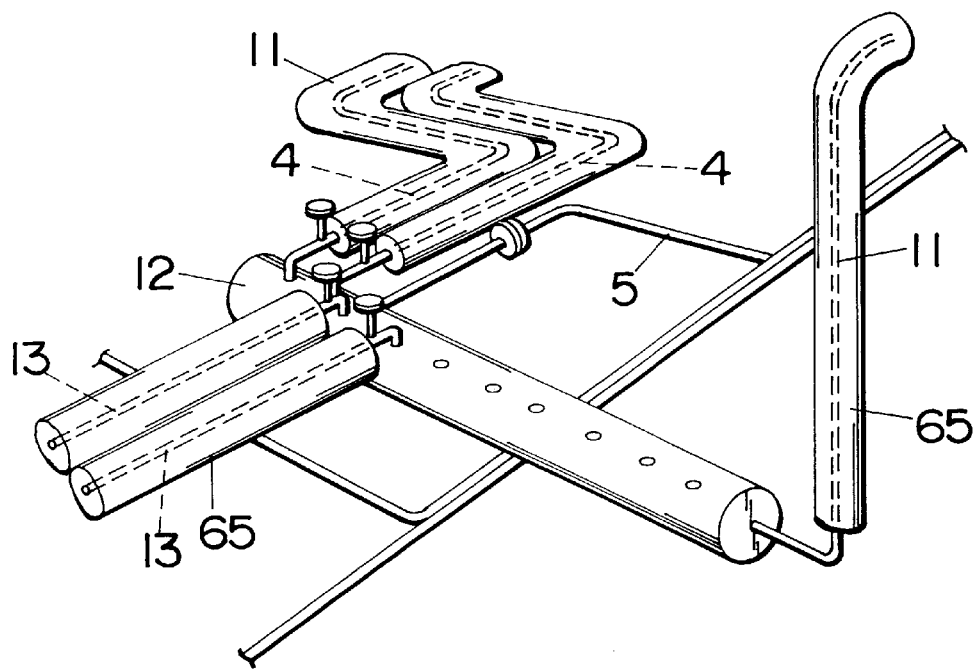
FIG. 7 is a perspective view of a header provided in the steam line of the steam cooking system.

In this embodiment, as shown in FIG. 7, steam generated in the steam generator 1 is firstly sent a header 12 through a main steam pipe 11 of the steam line 4, and then supplied to the steam outlets 26 of the cooking chamber 7 through the steam pipes 13 branched from the header 12. Thus, steam is individually supplied from the header 12 by the respective steam pipes 13. Therefore, an amount of steam supplied from one of the steam outlets 26 of the cooking chamber 7 is not influenced by that of steam supplied from the other steam outlet. This is useful to uniformly cook the foods with steam in the cooking chamber.

Alternatively, it is possible to use a single steam pipe connected at its one end to the header 12, and branched at its other end to connect with the steam outlets 26 of the cooking chamber 7. However, in this case, an amount of steam spouted from one of the steam outlets in the cooking chamber may be influenced by the amount of steam spouted from the other steam outlet. For example, when the piled-up baskets are concentrated around one of the steam outlets 26 in the cooking chamber 7, the amount of steam spouted from the steam outlet will decrease. On the contrary, the amount of steam spouted from the other steam outlet will increase because there is no obstacle around the steam outlet. Therefore, to uniformly cook the foods with steam in the cooking chamber 7, it is preferred to use the steam pipes 13 individually extending from the header 12 to the steam outlets 26 of the cooking chamber.

The steam cooking system of the present invention will be typically used according to the following procedure. For example, a waitress goes around in the restaurant, while pushing a wagon carrying piled-up baskets 6 in which foods to be cooked are set. In response to an order by guests, the waitress places the baskets on the cooking tray 60 in the cooking chamber 7. Since the cooking chamber 7 has the front window 23 facing the passage 9, the waitress can readily place the baskets in the cooking chamber 7. Then, the waitress pushes a button 42 of the control unit 40 corresponding to the ordered menu to cook the foods with steam for a required cooking time period. The waitress may leave the cooking chamber 7 after the steam-cooking operation is started. After the elapse of the cooking time period, the electromagnetic valves 30 are automatically closed to stop the supply of steam into the cooking chamber 7. The guests can take out the baskets 6 having the steam-cooked foods therein from the cooking chamber 7 by the use of tongs, and carry the baskets to the table 2 by themselves. Since the cooking chamber 7 has the rear window 24 facing the guests of the table 2, the guests can readily take out the baskets 6 from the cooking chamber through the rear window. In this case, since the basket temperature is high, the waitress should call the guest's attention to a handling of the baskets by the tongs. Of course, the waitress can take out the baskets 6 from the cooking chamber 7 through the front window 23, and carry the baskets to the guest's table 2.

Thus, by placing the foods to be cooked in the cooking chamber 7 and pushing the button 42 of the control unit 40 corresponding to the ordered menu, the foods can be safely and readily cooked with steam for an optimum cooking time period at the circumference of the guest table. This allows the guests to enjoy tasting the cooked foods at its optimum tasting temperature. Therefore, it is possible to solve the problem that the cooked foods are cooled during a carrying time period thereof from a kitchen separated from the guestroom to the guest's table. In addition, since used steam is exhausted outside the guestroom through the exhaust duct 28, it is possible to prevent a rising of the guestroom temperature by the used steam and a diffusion of smell occurring from the foods during the cooking time period into the guestroom. As the exhaust duct 28, it is preferred to provide a fan for forcedly exhausting the used steam from the cooking chamber 7. However, it is possible to exhaust the used steam through the exhaust duct 28 by natural ventilation.

By the way, the steam line 4 is usually covered with a heat-insulating material 65 to prevent the occurrence of hot-water drops by condensation of steam in the steam line, as shown in FIGS. 6 and 7. However, it is often difficult to completely cover the steam line 4 with the heat-insulating material because of a complex steam-pipe arrangement or a locally narrowed space around the steam-pipe. Therefore, hot-water drops may occur at a portion of the steam line 4 not covered with the heat-insulating material 65, and the hot-water drops generated in the steam line 4 may accidentally spout from the steam outlet 26 together with steam when the first valve 30 is opened. At this time, there is a possibility that the guests or waitress scald with the spouted hot-water drops.

Figure 8:
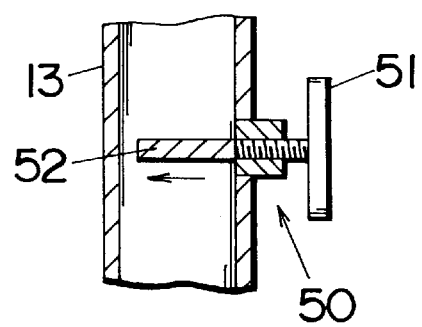
FIG. 8 is a cross-sectional view of a throttle valve provided in the steam line of the steam cooking system.

As a countermeasure to this problem, the cooking system of this embodiment is designed such that the hot-water drops are sent back to the steam generator 1 through the drain line 5, as shown in FIG. 2. In addition, it is preferred that the cooking system has a safety unit for preventing a spouting of the hot-water drops from the steam outlet 26 when the first valve 30 is opened. In this embodiment, as shown in FIG. 6, a throttle valve 50 as the safety unit is provided to a vertical portion of each of the steam pipes 13 of the steam line 4 and at downstream of the first valve 30. A rotational movement of a throttle handle 51 can manually operate the throttle valve 50. Additionally, in an emergency situation such as an accident of the first valve 30, it is possible to stop the supply of steam from the steam outlet 26 by rotating the throttle handle 51 toward a close position. As the throttle handle 51 is rotated toward the close position, a baffling member 52 of the throttle valve 50 gradually moves to shut the steam pipe 13, as shown by a horizontal arrow in FIG. 8. The baffling member 52 can effect as an obstacle for preventing the spouting of hot-water drops from the steam outlet 26.

Figure 9:
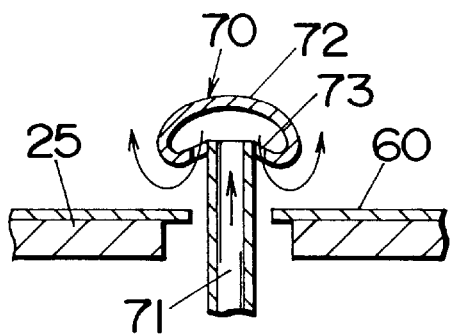
FIG. 9 is a cross-sectional view of a safety member attached to a steam outlet.

In addition, it is preferred to use a mushroom-type safety member 70 for preventing the spouting of hot-water drops from the steam outlet 26, as shown in FIG. 9. The safety member 70 is formed with a hollow stem 71 connected at a lower end thereof to the steam outlet 26 and a hollow cap 72 connected to an upper end of the hollow stem. The hollow cap 72 is formed in its bottom with at least one steam hole 73 for changing the spouting direction of the hot-water drops downward. Since the hot-water drops spouted from the steam holes 73 collide with the cooking tray 60, it is possible to avoid a dangerous situation that the steam outlet 26 accidentally spouts the hot-water drops toward the guests or waitress.

Figure 10:
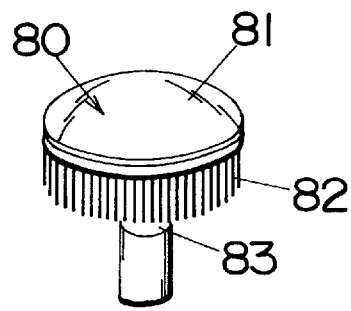
FIG. 10 is a perspective view of another safety member attached to steam outlet.

In place of the safety member 70, as shown in FIG. 10, it is possible to use a safety member 80, which is formed with a top plate 81, needle-like stoppers 82 depending from the top plate, and a hollow stem 83. The top plate 81 is connected to an upper end of the hollow stem 83. At least one steam hole (not shown) is formed at the circumference of the upper end of the hollow stem. Since the needle-like stoppers 82 block the hot-water drops spouted from the steam hole, only steam is supplied from the safety member 80 into the cooking chamber 7.

Figure 11:
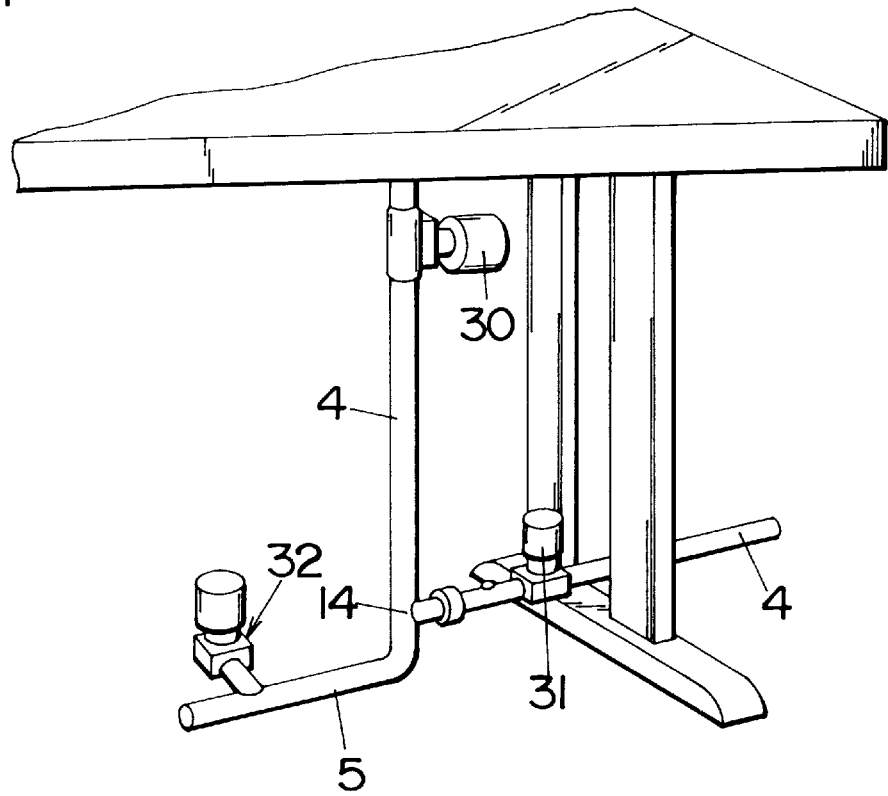
FIG. 11 is a perspective view of a drain line branched from the steam line of the steam cooking system of the present invention.
Figure 12:
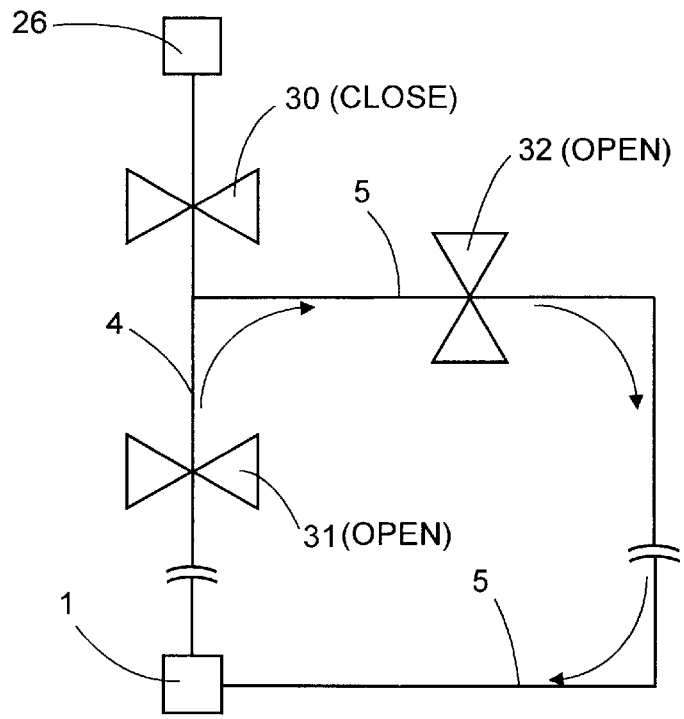
FIG. 12 is a steam-line diagram showing a valve control during a drain operation.
Figure 13:
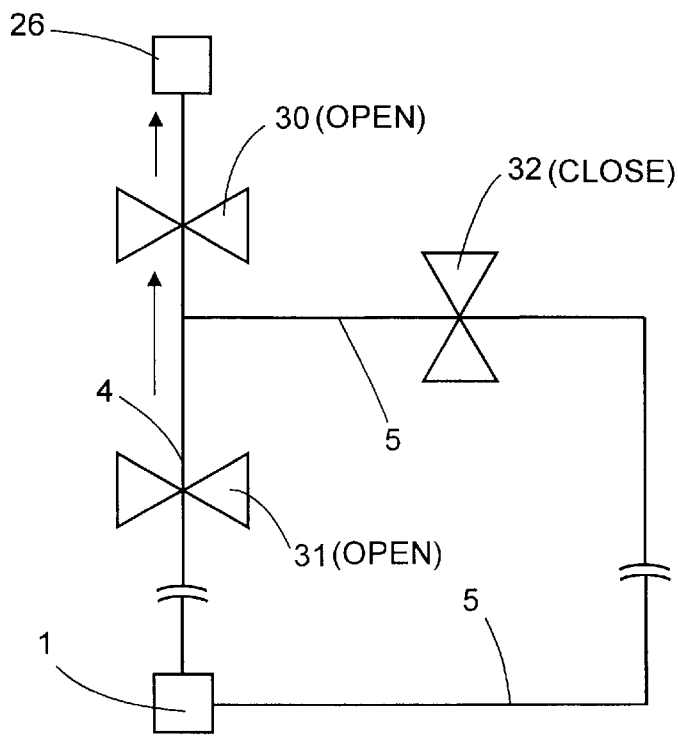
FIG. 13 is a steam-line diagram showing a valve control during the cooking operation.

It is further preferred to use a safety unit for removing hot-water drops generated by condensation of steam from the steam line 4 prior to the steam cooking operation, as shown in FIG. 11. That is, the drain line 5 is branched from a diverging point 14 in the steam line 4 to remove the hot-water drops from the steam line. The first valve 30 is provided in the steam line 4 at downstream of the diverging point 14. A second valve 31 is provided in the steam line 4 at upstream of the diverging point 14. A drain valve 32 is provided in the drain line 5 to separate the drain line from the steam line. As the second and drain valves, it is preferred to use conventional electromagnetic valves. It is preferred that the control unit 40 controls the first valve 30, second valve 31, and the drain valve 32 such that the drain valve is opened for a drain operation, for example, 1 minute, immediately before the cooking operation, while the second valve being kept at an open position and the first valve 30 being kept at a close position, as shown in FIG. 12, to thereby feed the hot-water drops from the steam line 4 to the drain line 5, and after the drain operation, the drain valve is closed and the first valve is opened for the steam cooking operation to supply steam from the steam outlet 26 into the cooking chamber 7, as shown in FIG. 13. Thus, since the hot-water drops can be removed from the steam line 4 prior to the steam cooking operation, this safety unit is particularly preferred to improve the safety of the steam cooking operation.

In the steam cooking system of the present invention, it is possible to boil water of a water-storing apparatus in a kitchen separated from the guestroom by applying steam supplied from the steam generator 1 without using a hot-water supply apparatus. This is useful to conserve energy.

This application is based upon and claims the priority of Japanese Patent Application No. 10-082173, filed in Japan on Mar. 27, 1998, the entire contents of which are expressly incorporated by reference herein.

What is claimed is:

1. A steam cooking system for restaurant comprising:

a steam generator disposed outside a guestroom of said restaurant;

a cooking chamber formed adjacent to each of tables in said guestroom, said cooking chamber having a bottom and a top;

at least one steam outlet formed in the bottom of said cooking chamber;

a steam line extending from said steam generator to said steam outlet;

a first valve provided in said steam line at the vicinity of said steam outlet to be switchable between an open position of supplying steam into said cooking chamber and a close position of stopping the supply of said steam;

control means for controlling said first valve to keep said first valve at said open position for a cooking time period determined according to a menu to be cooked with steam; and steam-exhausting means formed at the top of said cooking chamber to exhaust used steam from said cooking chamber to the outside of said guestroom.

2. The steam cooking system as set forth in claim 1, wherein said cooking chamber has a window, through which foods to be cooked can be placed into said cooking chamber, and wherein said cooking chamber and said control means are disposed such that said window and an operation panel of said control means face a passage extending adjacent to said table.

3. The steam cooking system as set forth in claim 1, wherein said cooking chamber has a first window facing a passage extending adjacent to said table and a second window facing guests of said table.

4. The steam cooking system as set forth in claim 1 further comprising safety means for preventing a spouting of hot-water drops generated by condensation of steam in said steam line from said steam outlet.

5. The steam cooking system as set forth in claim 4, wherein said safety means comprises a throttle valve provided in said steam line to regulate an amount of steam spouted from said steam outlet.

6. The steam cooking system as set forth in claim 4, wherein said safety means comprises a hollow stem connected at a lower end thereof to said steam outlet and a hollow cap connected to an upper end of said hollow stem, and wherein said hollow cap is formed in its bottom with at least one steam hole for changing a spouting direction of said hot-water drops downwardly.

7. The steam cooking system as set forth in claim 1, comprising a drain line branched from a diverging point in said steam line for removing hot-water drops generated by condensation of steam from said steam line, and a drain valve provided in said drain line to separate said drain line from said steam line.

8. The steam cooking system as set forth in claim 7, wherein said first valve is provided in said steam line at downstream of said diverging point; a second valve is provided in said steam line at upstream of said diverging point; and said control means controls said first valve, said second valve, and said drain valve such that said drain valve is opened for a drain operation immediately before a steam cooking operation, while said second valve being kept at an open position and said first valve being kept at a close position, to thereby feed said hot-water drops from said steam line to said drain line, and after said drain operation, said drain valve is closed and said first valve is opened for said cooking operation to supply steam from the steam outlet into said cooking chamber.

* * * * *